United States Patent [19]
Baker

[11] 4,135,235
[45] Jan. 16, 1979

[54] SYNTHESIZER CIRCUIT FOR GENERATING THREE-TIER WAVEFORMS

[75] Inventor: Richard H. Baker, Bedford, Mass.

[73] Assignee: Exxon Research & Engineering Co., Florham Park, N.J.

[21] Appl. No.: 846,696

[22] Filed: Oct. 31, 1977

[51] Int. Cl.$^2$ .......................................... H02M 7/537
[52] U.S. Cl. ...................................... 363/43; 363/132
[58] Field of Search .................... 363/17, 41, 43, 59, 363/60, 110, 131, 132

[56] References Cited

U.S. PATENT DOCUMENTS

| | | | |
|---|---|---|---|
| 3,248,633 | 4/1966 | Guarrera | 363/59 X |
| 3,371,232 | 2/1968 | Hannan et al. | 363/59 X |
| 3,851,182 | 11/1974 | Wallace | 363/60 X |

FOREIGN PATENT DOCUMENTS 2035223 1/1972 Fed. Rep. of Germany ............ 363/59

*Primary Examiner*—William M. Shoop
*Attorney, Agent, or Firm*—Kenneth Watov

[57] ABSTRACT

A DC to AC converter capable of producing up to three-tier waveforms includes a first transistorized switching amplifier operable to a first condition, for charging a first capacitor to +2E volts, concurrent with applying +E volts to a first terminal, and connecting a DC supply of −E volts to the positive plate of, and in series circuit with, a second capacitor (previously charged to have a voltage drop thereacross of −2E volts), the series circuit being connected between a reference and second terminals, for applying −3E volts to the second terminal. The first switching amplifier is operable to a second condition for charging the second capacitor to −2E volts, concurrent with applying −E volts to the second terminal, and applying +E volts to the negative plate of the first capacitor, the positive plate of which is connected to the first terminal, for applying +3E volts to the first terminal. A second transistorized switching amplifier is operable to a first or second condition, for individually connecting the first and second terminals to an output terminal, respectively. A control circuit is used to operate the first and second switching amplifiers in various combinations of their respective first and second conditions, over a period of time, for producing a desired waveform at the output terminal. Two or more of the converters can be interconnected and driven by the control circuit for providing polyphase voltage waveforms.

25 Claims, 12 Drawing Figures

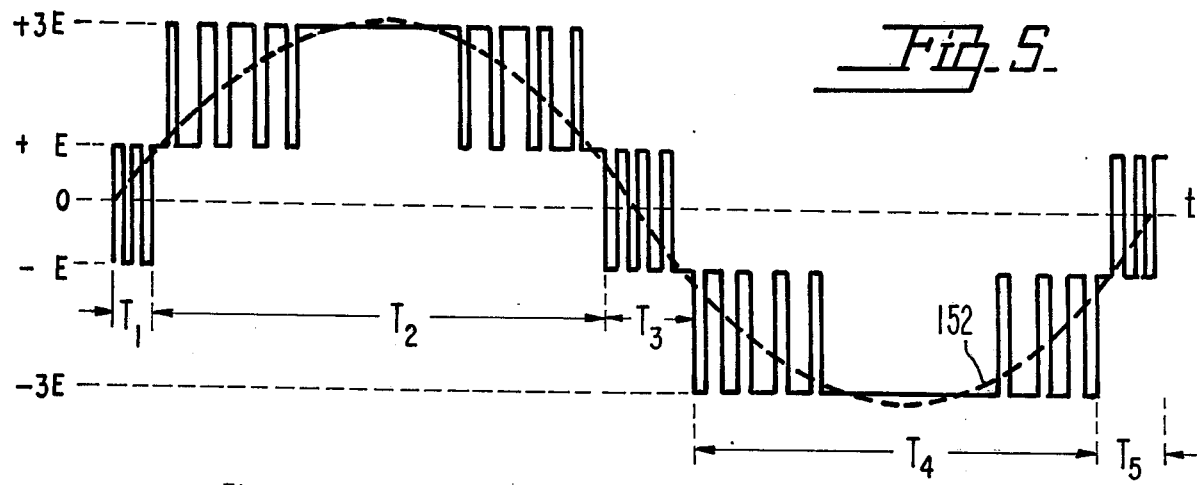
Fig. 5
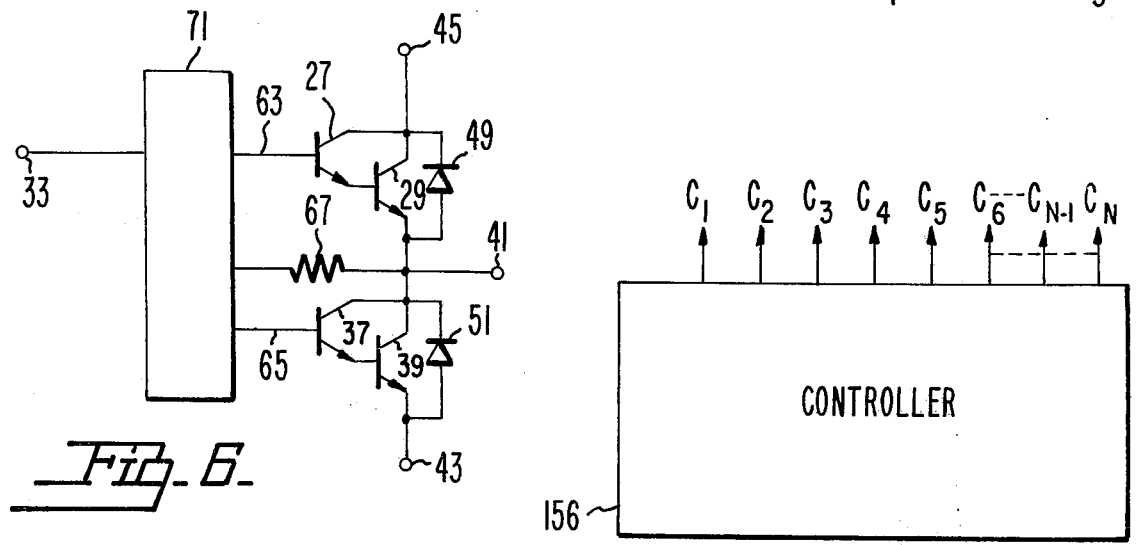
Fig. 6
Fig. 7
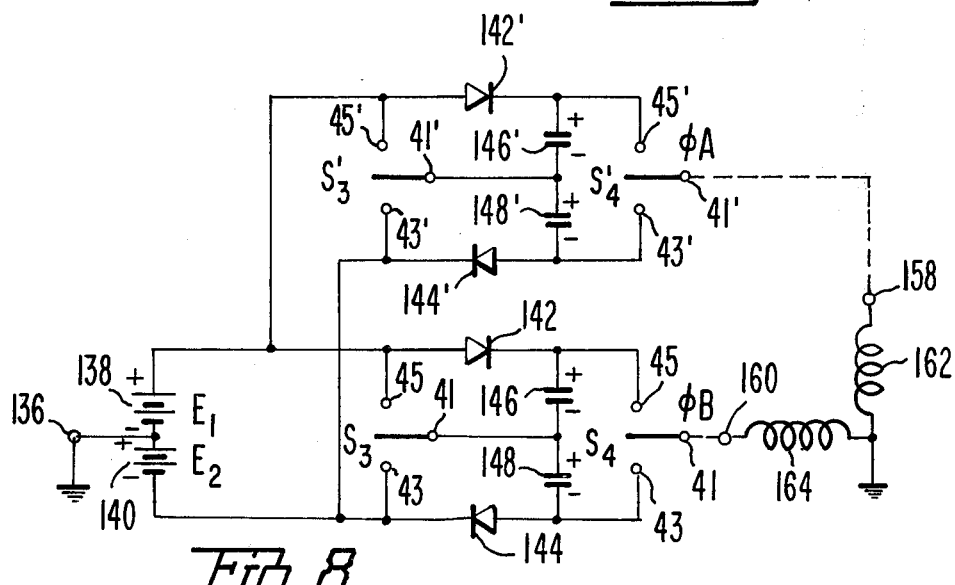
Fig. 8

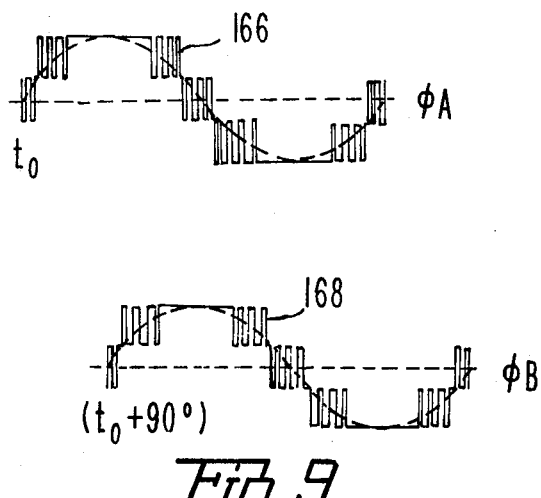
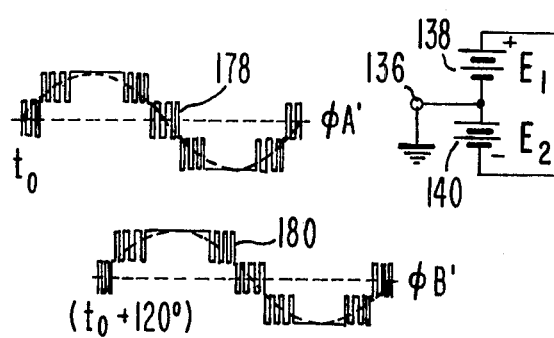
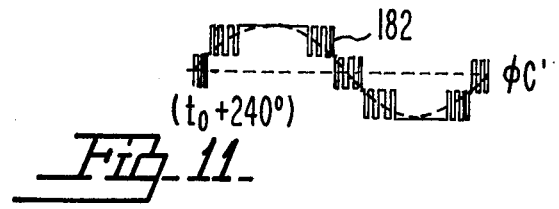
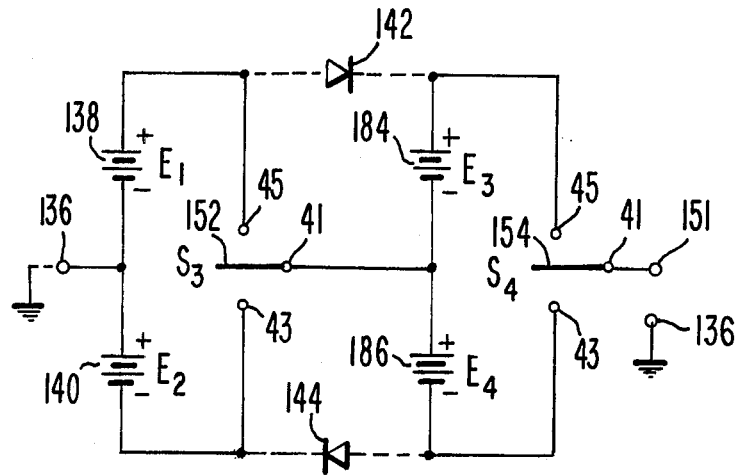

SYNTHESIZER CIRCUIT FOR GENERATING THREE-TIER WAVEFORMS

The field of the invention relates generally to electrical waveform synthesizers, and more particularly to DC to AC voltage converters.

Many different circuits are known in the art for converting a DC voltage into an AC voltage, and for synthesizing electrical waveforms. These circuits tend to be very complex, requiring a large number of components, resulting in high cost and reduced reliability. Also, many of these prior art circuits are limited to converting a DC voltage into a sinusoidal voltage at a fixed frequency or over a restricted frequency range.

The present invention is a circuit for generating three-tier waveforms, and is capable of synthesizing a desired AC waveform via stepwise approximation. First and second capacitors are each charged at different times within the period of the desired waveform to levels for maintaining a voltage thereacross of about $+2E$ and $-2E$ volts, respectively. In a first condition of the circuit, the first capacitor is charged to a level for providing $+2E$ volts thereacross, concurrent with applying $+E$ volts to an output terminal. In a second condition of the circuit, the first capacitor is permitted to charge as in the first condition, but the second capacitor is connected in series with a voltage supply providing $-E$ volts, for applying $-3E$ volts to the output terminal. In a third condition of the circuit, the second capacitor is charged to a level for producing thereacross a voltage of $-2E$ volts, concurrent with applying $-E$ volts to the output terminal. In a fourth condition of the circuit, the second capacitor is charged as in the third condition, concurrent with connecting the previously charged first capacitor in series with a DC voltage supply providing $+E$ volts for applying $+3E$ volts to the output terminal. Accordingly, the waveform generator circuit is successively operated to various ones of the first through fourth conditions, for predetermined periods of time in each condition, for generating a desired waveform. Two or more such waveform generator circuits are interconnected in second and third embodiments of the invention to provide polyphase related waveforms.

In the drawings, where like items are indicated by the same reference designation:

FIG. 5 shows a typical three-tier notched stepwise approximation of an AC waveform, in this example a sinewave;

FIG. 6 is a circuit schematic and block diagram of a high-power switching amplifier;

FIG. 7 is a block diagram of a controller for providing control signals for operating the various transistorized switches of the present invention;

FIG. 8 is a circuit schematic diagram of a second embodiment of the invention;

FIG. 9 shows typical output waveforms for the circuit of FIG. 8;

FIG. 10 is a circuit schematic diagram of a third embodiment of the invention;

FIG. 11 shows shows typical waveforms for the circuit of FIG. 10; and

FIG. 12 is a circuit schematic diagram of fourth embodiment of the invention.

Figure 1:
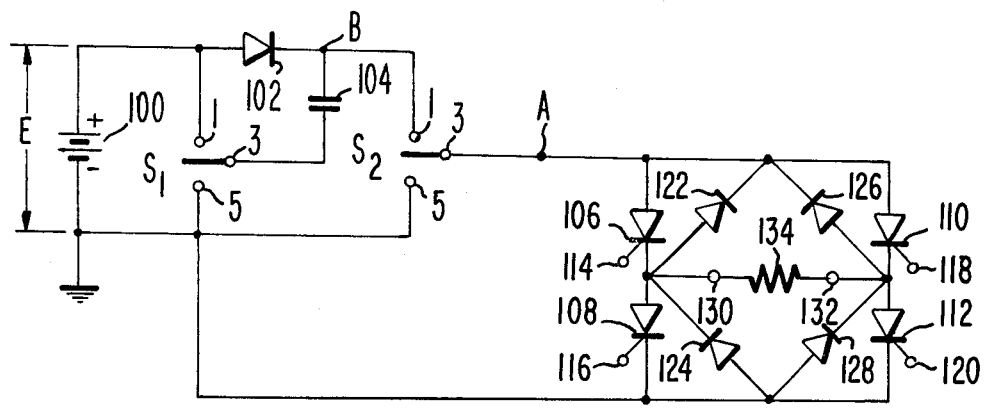
FIG. 1 is a circuit schematic diagram of a prior art DC to AC converter.
Figure 2:
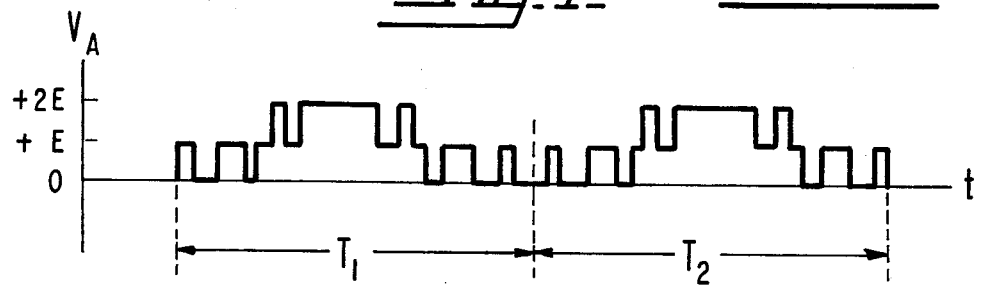
FIG. 2 shows a typical two-level unipolarity waveform that might be produced at point A in the circuit of FIG. 1.
Figure 3:
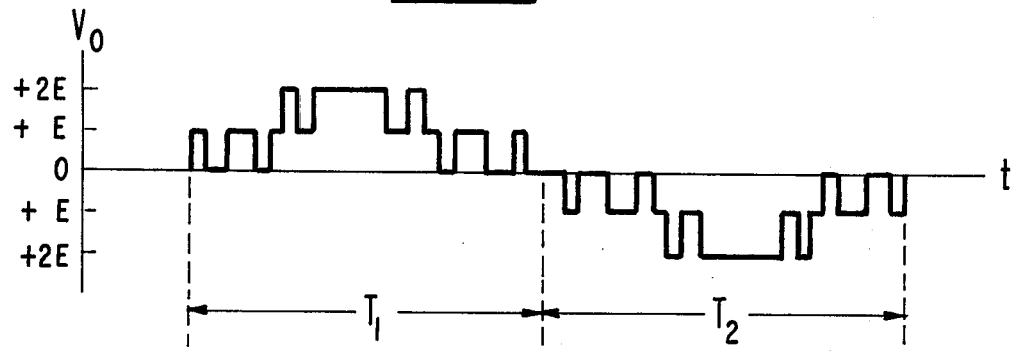
FIG. 3 shows a typical four-level notched stepwise approximation of an AC waveform, in this example a sinewave.

In FIG. 1, a prior art DC to AC converter includes a DC voltage supply 100 (shown as a battery) having a level of voltage equal to E volts, a level-shifting stage including a pair of switches $S_1$, $S_2$, a diode 102 and a capacitor 104; and a bridge-connected mixer network including SCR's 106, 108, 110 and 112, each having a control terminal 114, 116, 118, 120 respectively; four diodes 122, 124, 126, 128; and a pair of output terminals 130 and 132 between which a load impedance 134 may be connected. In operation, when switch $S_1$ is operated to connect its pole 3 to its lower contact 5, the level of voltage at point B is about $+E$ volts, and capacitor 104 begins taking on charge. If switch $S_1$ is maintained in its down position for a sufficient period of time, a capacitor 104 will fully charge, resulting in a voltage drop thereacross of $+E$ volts. Thereafter, if switch $S_1$ is now operated to connect its pole 3 to its upper contact 1, the capacitor 104 is connected in series with the DC voltage supply or battery 100, raising the level of voltage at point B to $+2E$ volts. Switch $S_2$ is operated to its upper position connecting its pole 3 to its upper contact 1, for applying the voltage at point B to point A, and to its lower position for connecting its pole 3 to its lower contact 5 for applying a reference potential, ground in this example, to point A. By selectively operating switches $S_1$ and $S_2$ between their respective upper and lower positions in different combinations at different times, the two-level unipolarity notched waveform shown in FIG. 2 can be obtained at point A, for example. Control signals are selectively applied to the operating terminals 114, 116, and 118, 120, of SCR's 106, 108, 110 and 112, respectively, for turning on and off in pairs, that is, 106 and 112 together, 108 and 110 together, to operate the mixer network for converting the two-level waveform of FIG. 2 into the four-level waveform of FIG. 3, for example. In this manner, a stepwise approximation of a sinewave can be generated, for example. A disadvantage of this SCR mixer circuit is the complexity of the circuitry necessary to turn off the conducting ones of the SCR's 106, 112, 108, and 110. It should be noted that an SCR is a solid-state switching device that can be turned on by applying a control signal to its control terminal, but can be turned off only by either interrupting the flow of current to its main current conduction path, or backbiasing the anode-cathode electrodes of its main current path.

Figure 4:
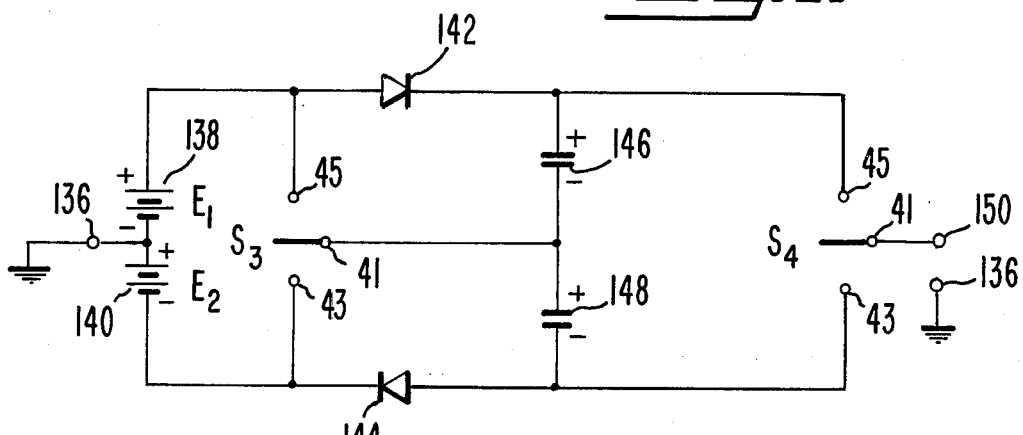
FIG. 4 is a circuit schematic diagram of a first embodiment of the subject invention.

In FIG. 4, the circuit for the first embodiment of the invention includes reference terminals 136 for connection to a source of reference potential, ground in this example, a first battery or DC voltage source 138 for providing a DC voltage $+E_1$, a second battery or DC voltage source 140 for supplying a DC voltage $-E_2$, first and second single-pole-double-throw switches $S_3$ and $S_4$ each having input terminals 43 and 45, and an output terminal 41, diodes 142 and 144, polarized for passing current in the same direction, two capacitors 146 and 148, and an output terminal 150. In operation, switch $S_3$ is operated to a first condition where its pole 152 is connected to its input terminal contact 45, for establishing a current conduction path between its input terminal 45 and output terminal 41. With switch $S_3$ in its first condition, capacitor 148 is placed in a series circuit with batteries 138 and 140, switch $S_3$ and diode 144. The positive terminal of battery 138 is connected via switch $S_3$ to one plate of capacitor 148, and the negative terminal of battery 140 is applied via the now forwardbiased diode 144 to the other plate of the capacitor 148. Accordingly, charging current flows from reference terminal 136, through battery 138, switch $S_3$, capacitor 148, diode 144, through battery 140, back to reference terminal 136, thereby charging capacitor 148. Assuming that switch $S_3$ is maintained in its first condition for a sufficient period of time, capacitor 148 can charge to a level where the voltage thereacross approaches the sum of the battery voltages $E_1$ and $E_2$, with the polarity shown. Concurrent with charging capacitor 148, that is, with switch $S_3$ in its first condition, the forwardbiasing of diode 144 causes $-E_2$ volts to be applied to input terminal 43 of switch $S_4$. Also at this time, capacitor 146 is connected in parallel with diode 142 via switch $S_3$, and this parallel combination in series with the battery 138 between reference terminal 136 and input terminal 45 of switch $S_4$. Assuming that capacitor 146 has been previously charged to a voltage level about equal to the sum of $E_1$ and $E_2$, with a polarity as shown, the diode 142 is backbiased since the voltage at its cathode electrode is greater than the voltage at its anode electrode by about $E_2$ volts. Accordingly, capacitor 146 is effectively connected in series with battery 138, thereby causing a voltage having a level equal to the voltage across capacitor 146 ($E_1 + E_2$) plus the battery voltage $E_1$, that is, a voltage having a level of $+(2E_1+E_2)$, to be applied to input terminal 45 of switch $S_4$. Note that when capacitor 146 begins discharging, the voltage so applied to terminal 45 of $S_4$ will decrease exponentially.

Switch $S_3$ is operable to a second condition for connecting its pole 152 to its lower contact or input terminal 43, for establishing a current conduction path between its input terminal 43 and its output terminal 41. At this time diode 142 is forwardbiased, thereby applying $+E_1$ volts to input terminal 45 of switch $S_4$, and permits charging current to flow through the charging path including batteries 138, 140, diode 142, switch $S_3$, and capacitor 146, for charging capacitor 146. Assuming that switch $S_3$ is maintained in its second condition for a sufficient period of time, capacitor 146 charges to a level where the voltage thereacross approaches the sum of the voltages $E_1$ and $E_2$, with the polarity indicated. Concurrently, capacitor 148 is connected in parallel across diode 144. Assuming that the capacitor 148 has been fully charged as previously described, diode 144 is backbiased by the application of $-E_2$ volts at its cathode electrode, and a negative voltage of $-(E_1+E_2)$ volts at its anode electrode. Accordingly, with switch $S_3$ in its second condition, capacitor 148 is connected in series with battery 140 between terminals 136 and 43, thereby applying a voltage having a level equal to $-(E_1+2E_2)$ to input terminal 43 of switch $S_4$. As noted above, if capacitor 148 is allowed to begin to discharge, the voltage so applied to input terminal 43 of $S_4$ will begin to decrease.

Switch $S_4$ is operable to a first condition for connecting its pole 154 to its input terminal 45, for establishing a current conduction path between its input terminal 45 and its output terminal 41, thereby applying the voltage at its input terminal 45 to the output terminal 150. Similarly, switch $S_4$ is operable to a second condition for connecting its pole 154 to its input terminal 43, for establishing a current conduction path between its input terminal 43 and its output terminal 41, for applying the voltage at its input terminal 43 to output terminal 150.

By operating the switches $S_3$ and $S_4$ to different combinations of their first and second conditions over a period of time, a desired time varying waveform can be produced between output terminal 150 and reference terminal 136. It should be noted that in normal operation of the circuit of FIG. 4, a period of initialization is required for first charging capacitors 146 and 148 as described above. Assuming that the batteries 148 and 140 produce equal levels of voltage E, that is, $E_1=E_2=E$, the notched three-tier stepwise approximation of a sinewave 152 can be produced as shown in FIG. 5. The notching is included at predetermined times in the synthesized waveform for reducing the harmonic content thereof. In general, the first tier of the waveform shown, occurring over the periods of time $T_1$, $T_3$ and $T_5$, is produced by alternately and repetitively placing switches $S_3$ and $S_4$ simultaneously in their second and first conditions respectively, for producing $+E$ volts, and then in their first and second conditions respectively, for producing $-E$ volts. The second tier of the waveform occurring over time period $T_2$ is produced by maintaining switch $S_4$ in its first condition, while alternating switch $S_3$ between its first and second conditions, where in the first condition of switch $S_3$ $+E$ volts are produced at output terminal 150, and in its second condition $+E$ volts are produced. The third tier of the waveform occurring over time period $T_4$ is produced by maintaining switch $S_4$ in its second condition, while alternating switch $S_3$ between its first and second conditions, where the first condition of $S_3$ produces $-E$ volts at output terminal 150, and the second condition $-3E$ volts. The width of the notches are determined by the length of time that switch $S_3$ is maintained in its first or second conditions, and alternating between these positions for producing the desired waveform as described. An important aspect of this circuit configuration is that numerous other waveforms can be produced merely by operating the switches $S_3$ and $S_4$ in various combinations of their first and second conditions over a period of time. Also, in this manner other than symmetrical waveforms can be produced.

In FIG. 6, a portion of a high-power switching amplifier circuit is shown, suitable for serving as each one of the switches $S_3$ and $S_4$ in the circuit shown in FIG. 4, for example. In operation, when a control signal having a positive or "high" level of voltage (hereinafter referred to as a level of "1") is applied to the control terminal 33, the buffer stage 71 responds supplying current along control line 65 into the base of transistor 37. The NPN Darlington amplifier 37, 39 responds by turning on and substantially connecting output terminal 41 to terminal 43 via the main conduction path of the Darlington 37, 39. Also at this time, in response to the "high" level signal at terminal 33, the buffer stage 71 responds by drawing current out of the base of transistor 27 thereby keeping Darlington 27, 29 turned off. When the control signal goes low (hereinafter referred to as level "0"), the buffer control circuit 71 responds by drawing current from the base transistor 37 and the Darlington amplifier 37, 39 turns off in response thereto. Meanwhile, the buffer circuit 71 now supplies current into the base of transistor 27, Darlington amplifier 27, 29 turns on, and current flows from the input terminal 45 through the main current path of the Darlington amplifier 27, 29 to the output terminal 41, raising the level of voltage at the output terminal 41 to a positive level (assuming a positive voltage is being applied to terminal 45). If (when) the control signal at terminal 33 goes high again, buffer control circuit 71 responds by again drawing current from the base of transistor 27, for turning off Darlington 27, 29. Also, buffer 71 responds by supplying (again) current into the base of transistor 37, for turning on Darlington 37, 39. In this manner, single-pole-double-throw break-before-make switching action is provided by the circuit of FIG. 6. Buffer circuit 71 can be provided by digital logic or digital analogue circuitry, as would be known to one skilled in the art. It should be noted that other transistorized switching amplifiers or circuits providing the same function as the circuit of FIG. 6, can be applied for use as switches $S_3$ and $S_4$.

Assume that the switching action indicated for $S_3$ and $S_4$ are provided by a switching amplifier circuit as shown in FIG. 6. Accordingly, two individual control signals herein designated as $C_1$ and $C_2$ must be applied to the respective control terminals 33 of each one of the switches $S_3$ and $S_4$, respectively, for operating these switches to produce a desired waveform at output terminal 150. A controller, such as the block 156 shown in FIG. 7, is required to supply the control signals $C_1$ and $C_2$. In those applications where programmability is not important, that is, where only a single waveform is desired to be synthesized from a pair of DC voltage sources 138 and 140, the controller 156 can be hardwired digital logic. If it is required that any given one of a plurality of waveforms be synthesized at given times, respectively, the controller 156 can be provided by a microprocessor. In the latter case, the microprocessor is programmed for producing a desired waveform. As shown in the State Table given below, the level of the output signal produced across terminals 150 and 136, for different combinations of a "1" state or "0" state for the control signals $C_1$ and $C_2$, for the circuit of FIG. 4, are as follows:

| STATE TABLE FOR FIG. 4 | | |
|---|---|---|
| Control Signal | | Level of Output Voltage |
| $C_1$ | $C_2$ | Across Terminals 150, 136 |
| 1 | 0 | $+E_1$ |
| 0 | 1 | $-E_2$ |
| 0 | 0 | $+(2E_1+E_2)$ |
| 1 | 1 | $-(E_1+2E_2)$ |

In FIG. 8, a second embodiment of the invention includes two synthesizer circuits connected substantially in parallel across a common DC supply 138, 140. Each one of these circuits is identical to the synthesizer circuit of FIG. 4, with the reference designations of one being primed, the other unprimed.

The controller 156 of FIG. 7 is assumed to be a microprocessor programmed for providing control signals $C_1-C_4$, for operating switches $S_3$, $S_4$, $S'_3$, $S'_4$, respectively, for producing two-phase output voltages $\phi A$ and $\phi B$ at output terminals 41' and 41, respectively. In this example, the output voltages $\phi A$, $\phi B$ are applied to motor terminals 158, 160, respectively, for energizing the two-phase windings 162, 164 of a two-phase AC motor. In FIG. 9, typical two-phase waveforms or output voltages for $\phi A$ and $\phi B$ are shown 90° out of phase with one another, as required. Stepwise approximated sinewaves 166, 168 are shown for $\phi A$ and $\phi B$, respectively, for example. Along with each waveform 166, 168 the pure sinewave being synthesized is shown in phantom as a broken line. It should be noted that the microprocessor 156 can be programmed for producing many other two-phase related waveforms.

In FIG. 10, a three-phase system includes three synthesizer circuits connected in parallel across a common DC supply 138, 140. As with the two-phase system of FIG. 8, each one of these circuits is identical to the circuit of FIG. 4, with unprimed reference designations being used for the circuit producing the third phase $\phi C'$ voltage, single-primed for the second phase $\phi B'$ voltage, and double-primed for the first phase $\phi A'$ voltage. The three-phase voltages $\phi A'$, $\phi B'$, $\phi C'$ are 120° out of phase with one another, comparing one phase to the next occurring phase, as indicated in FIG. 11. Stepwise approximated sinewaves are shown as typical three-phase waveforms 178, 180, 182, for example, with the pure sinewave equivalent shown in phantom. The three-phase voltages $\phi A'$, $\phi B'$ and $\phi C'$ are produced at output terminals 41", 41' and 41, respectively, for application to motor terminals 166, 168 and 170, respectively, for example. Accordingly, the $\phi A'$, $\phi B'$, and $\phi C'$ voltages energized the motor windings 172, 174 and 176, respectively. Although the load shown is the windings 172, 174, 176 of a three-phase motor, many other three-phase loads can be driven by this system. In this case the controller 156 is again assumed to be a microprocessor programmed for providing control signals $C_1-C_6$, for operating switches $S_3$, $S_4$, $S'_3$, $S'_4$, $S''_3$ and $S''_4$, respectively, for producing the three-phase output voltages $\phi A'$, $\phi B'$, $\phi C'$, respectively. It should be noted that controller 156 can be programmed for producing many different three-phase related waveforms, in addition to sinewaves.

Any number up to "N" phase polyphase AC voltage supply ("N" is equal to the number of phases) can be obtained via the parallel connection of "N" converter stages of FIG. 4 across a common DC voltage supply, in a manner similar to the FIG. 8 circuit and as shown in phantom in the FIG. 10 circuit. The microprocessor 156 must then be expanded, and programmed for providing pairs of control signals $C_1$, $C_2$ through $C_{N-1}$, $C_N$, for operating the two switches of each one of the N converter stages, respectively. As previously mentioned, in a two-phase system the AC output voltages are 90° out of phase. In a polyphase system having three or more phases, each phase voltage is 360°/N out of phase with the immediately preceding or succeeding phase voltage. In addition, the DC voltage supplies 138 and 140 of FIGS. 4, 8 and 10 although shown as batteries, can also be each provided by either a solar cell, solar cell panel, or fuel cell, or some combination thereof, for example. The microprocessor or controller 156 can also be programmed for operating the circuits of FIGS. 4, 8 and 10 to produce notches at predetermined times in each cycle or period of the perspective waveform, for reducing the harmonic content of the synthesized waveform. Also, the N converter stages can be operated either in phase for parallel operation (provides increased current gain) or at unequal phase intervals, via appropriate programming of the microprocessor.

In FIG. 12, a fourth embodiment of the invention is shown. This embodiment is substantially identical to the circuit of FIG. 4, except for the capacitors 146 and 148 of FIG. 4 being replaced by batteries or DC voltage supplies 184, 186, respectively, in FIG. 12. As previously noted, the DC voltage supplies 184, 186 can either or both be provided also by a solar cell, solar cell panel, fuel cell array and so forth. The batteries can take on charge, as described for capacitors 146 and 148 in the operation of the circuit of FIG. 4. It should be noted that solar cells and fuel cells will not so charge as the capacitors they replace. Operation of the FIG. 12 circuit is as given in the following State Table (assuming $S_3$ and $S_4$ each provided by circuit of FIG. 6):

| STATE TABLE FOR FIG. 12 | | |
|---|---|---|
| Control Signal | | Level of Output Voltage |
| $C_1$ | $C_2$ | Across Terminals 150, 136 |
| 1 | 0 | $+E_3-E_2$ |
| 0 | 1 | $-E_4+E_1$ |
| 0 | 0 | $+(E_1+E_3)$ |
| 1 | 1 | $-(E_2+E_4)$ |

From the State Table for FIG. 12, it is noted that if $E_1$ and $E_2$ each equal E volts, and $E_3$ and $E_4$ each equal 2E volts, an output of $+E$, $-E$, $+3E$, or $-3E$ volts can be generated. In FIG. 12, the diodes 142 and 144 are shown in phantom, in that they generally are not required when the DC supplies 184 and 186 are provided either by batteries, fuel cells, solar cell panels, or solar cells. However, in certain applications where 184 and 186 are provided by batteries, the diodes 142 and 144 can be included for charging the batteries in a manner analogous to charging capacitors 146 and 148 of FIG. 4. In this latter case it is necessary that the voltage levels $E_3$ and $E_4$ each be substantially equal to the sum of the voltage levels $E_1$ and $E_2$.

What is claimed is:

1. A DC voltage to AC voltage converter, including a first stage comprising:
   first and second power terminals for receiving positive and negative polarity DC voltages, respectively;
   a third power terminal for connection to a point of reference potential;
   an output terminal, said AC voltage being developed across said third power and output terminals;
   first switching means having first and second input terminals connected to said first and second terminals of said converter, respectively, and an output terminal;
   second switching means having first and second input terminals, and an output terminal connected to said output terminal of said converter;
   first unidirectional current means connected between the first input terminals of said first and second switching means, respectively, said first unidirectional current means being polarized for passing current from said first power terminal to said first input terminal of said second switching means;
   second unidirectional current means connected between said second input terminals of said first and second switching means, respectively, said second unidirectional current means being poled for passing current from said second input terminal of said second switching means to said second power terminal; and
   first and second electrical charge storage means connected in a series circuit between said first and second input terminals of said second switching means, the common connection between said first and second charge storage means being connected to the output terminal of said first switching means;
   said first switching means being operable to a first condition for establishing a current conduction path between its output and first input terminals, whereby a positive voltage equal in level to the sum of the levels of said positive polarity DC voltage and the voltage across said first charge storage means is applied to the first input terminal of said second switching means, and concurrently said second charge storage means charges, when necessary, for providing thereacross a negative level of voltage approaching the sum of the levels of said positive and negative polarity DC voltage, and said negative polarity DC voltage is applied to the second input terminal of said second switching means;
   said first switching means being operable to a second condition for establishing a current conduction path between its output and second input terminals, whereby a negative voltage equal in level to the sum of the levels of said negative polarity DC voltage and the voltage across said second charge storage means is applied to the second input terminal of said second switching means, and concurrently said first charge storage means charges, when necessary, for providing thereacross a positive level of storage approaching the sum of the levels of said positive and negative polarity DC voltages, and said positive polarity DC voltage is applied to the first input terminal of said second switching means;
   said second switching means being operable to a first condition for establishing a current conduction path between its first input and output terminals, and a second condition for establishing a current conduction path between its second input and output terminals.

2. The DC to AC converter of claim 1, wherein said first and second electrical charge storage means each include a capacitor.

3. The DC to AC converter of claim 1, wherein said first and second electrical charge storage means each include a battery.

4. The DC to AC converter of claim 1, wherein said first and second unidirectional current means each include a diode, respectively.

5. The DC to AC converter of claim 1, wherein said first and second switching means each include a single-pole-double-throw switch, respectively.

6. The DC to AC converter of claim 1, wherein said first and second switching means each include a transistorized switching amplifier, respectively, each one of said amplifiers having a control terminal for receiving a "low" level control signal or a "high" level control signal, each one of said amplifiers being responsive to a "low" level control signal for establishing said first condition, and to a "high" level control signal for establishing said second condition; said converter further including:
   means for producing individual "high" and "low" level control signals for application to the control terminals of said switching amplifiers in a predetermined order and in predetermined combinations over a period of time, for producing a desired waveform.

7. The DC to AC converter of claim 1, further including a second stage substantially identical to said first stage, said first and second stages having their first power terminals connected together, and their second power terminals connected together, wherein the first and second switching means of each one of said first and second converter stages are concurrently operable to different combinations of their respective first and second conditions, at different times within a period of time, for producing at their respective output terminals, AC voltages having identical waveforms, but 90° out of phase with one another, thereby providing a DC to two-phase AC voltage converter system.

8. The DC to AC converter of claim 1, further including N stages substantially identical to said first stage, N being any integer number equal to or greater than two, said first and N stages each having their first power terminals connected together, and their second power terminals connected together, wherein the first and second switching means of each one of said first and N converter stages are in one mode of operation concurrently operable to different combinations of their respective first and second conditions, at different times within a period of time, for producing at their respective output terminals, AC voltages that are 360°/N out of phase with respect to output voltages between adjacent stages, thereby providing a DC to N-phase AC voltage converter system, and in another mode of operation concurrently operable all in phase for parallel operation.

9. The DC to AC converter of claim 6, wherein said control signal producing means is a microprocessor programmed for producing said control signals.

10. A generator for producing AC waveforms having up to three tiers, comprising at least a first stage including:
first and second electrical energy storage means;
first and second DC voltage sources, each having positive and negative voltage terminals, for supplying first and second DC voltages, of opposite polarity, respectively;
a first terminal for receiving a source of reference potential, and connected to opposite polarity terminals of said first and second DC voltage sources;
a second terminal, an output signal being produced across said first and second terminals;
first and second unidirectional current means;
switching means selectively operable to one of first through fourth conditions, said first condition being for concurrently connecting said first DC voltage source and first unidirectional current means in series between said first and second terminals, for applying said first DC voltage to said second terminal, and connecting in a series circuit said first and second DC voltage sources, said first unidirectional current means, and first electrical energy storage means, for charging said first electrical energy storage means towards a charge level where the voltage thereacross approaches substantially the sum of said first and second DC voltages, said second condition being for concurrently connecting said second voltage source and second unidirectional current means in series between said first and second terminals, for applying said second DC voltage to said second terminal, and connecting in a series circuit said first and second DC voltage sources, said second unidirectional current means, and second electrical energy storage means, for charging said second electrical energy storage means towards a charge level where the voltage thereacross approaches substantially the sum of said first and second DC voltages, said third condition being for concurrently charging said first electrical energy storage means as in said first condition, and connecting said second electrical energy storage means in parallel with said second unidirectional means, and this parallel combination in series with said second DC voltage source between said first and second terminals, for applying a voltage having a level equal to the sum of said second DC voltage and the voltage across said second electrical energy storage means to said second terminal, said fourth condition being for concurrently charging said second electrical energy storage means as in said second condition, and connecting said first electrical energy storage means in parallel with said first unidirectional means, and this latter parallel combination in series with first DC voltage source between said first and second terminals, for applying a voltage having a level equal to the sum of said first DC voltage and the voltage across said first electrical energy storage means to said second terminal.

11. The waveform generator of claim 10, wherein said first and second electrical energy storage means each include a capacitor.

12. The waveform generator of claim 10, wherein said first and second electrical energy storage means each include a battery.

13. The waveform generator of claim 10, wherein said first and second unidirectional means each include a diode.

14. The waveform generator of claim 10, wherein said switching means includes:
a first single-pole-double-throw switch means having a first input terminal for receiving said first DC voltage, a second input terminal for receiving said second DC voltage, and an output terminal, said first and second unidirectional current means each being oppositely polarized, and each having one electrode connected individually to said first and second input terminals, respectively, said first and second charge storage means being connected in series between other electrodes of said first and second unidirectional current means, respectively, the common connection of said first and second charge storage means being connected to said output terminal; and
a second single-pole-double-throw switch means having first and second input terminals connected individually to the other electrodes of said first and second unidirectional current means respectively, and an output terminal connected to said second terminal of said generator;
said first single-pole-double-throw switch means being operable in the first and third conditions for providing a current conduction path between its output and second input terminals, and in the second and fourth conditions for providing a current conduction path between its output and first input terminals;
said second single-pole-double-throw switch means being operable in the first and third conditions for providing a current conduction path between its output and first input terminals, and in the second and fourth conditions for providing a current conduction path between its output and second input terminals.

15. The waveform generator of claim 14, wherein said first and second single-pole-double-throw switch means each comprise a transistorized switching amplifier, each one of said switching amplifiers including said first and second input terminals, said output terminals, and a control terminal for receiving first and second control signals, respectively, wherein said waveform generator further includes:

control means for providing said first and control signals for operating said switching amplifiers for producing a desired waveform.

16. The waveform generator of claim 10, further including a plurality of N stages each identical to said first stage, each having their first terminals connected together, each sharing a common first and second DC voltage source, the switching means of each stage being operable to different combinations of their respective first through fourth conditions over a period of time, for producing at respective output terminals of succeeding stages, AC waveforms 90° out of phase for N equal to 2, and 360°/(N + 1) out of phase for N equal to any integer greater than 1, thereby providing in one mode of operation a polyphase waveform generator and in another mode of operation said stages are all operable in parallel for increased current gain.

17. The waveform generator of claim 15, wherein said control means is a microprocessor programmed for producing said first and second control signals.

18. In a circuit for converting a DC voltage into a stepwise approximated AC voltage having up to three tiers, a first stage comprises:

first through fourth DC voltage supply means each having positive and negative voltage terminals, for supplying first through fourth DC voltages having levels $E_1$, $E_2$, $E_3$ and $E_4$, respectively;

a first terminal for receiving a source of reference potential, said first terminal being connected to the negative and positive terminals of said first and second voltage sources, respectively;

a second terminal, said AC voltage being developed at said second terminal;

switching means selectively operable to one of first through fourth conditions, said first condition being for connecting said second and third DC voltage supply means in series opposition between said first and second terminal for producing ($+E_3 - E_2$) volts at said second terminal, said second condition being for connecting said first and fourth DC voltage supply means in series opposition between said first and second terminals, for producing ($-E_4 + E_1$) volts at said second terminal, said third condition being for connecting said first and third DC voltage supply means in series between said first and second terminals, for producing $+(E_1 + E_3)$ volts at said second terminal, and said fourth condition being for connecting said second and fourth DC voltage supply means in series between said first and second terminals, for producing $-(E_2 + E_4)$ volts at said second terminal.

19. The DC to AC converter circuit of claim 18, wherein said first through fourth DC voltage supply means each include a battery.

20. The DC to AC converter circuit of claim 18, wherein said first through fourth DC voltage supply means each include a solar cell panel.

21. The DC to AC converter circuit of claim 18, wherein said first through fourth DC voltage supply means each include a fuel cell array.

22. The DC to AC converter circuit of claim 18, wherein said first through fourth DC voltage supply means include any combination of solar cell panels, fuel cells, and batteries.

23. A method for generating stepwise approximated AC waveforms having up to three tiers, comprising the steps of:

(1) applying $+E_1$ volts and $-E_2$ volts to opposite ends of a first capacitor, respectively, for charging this capacitor to have a voltage thereacross of $+(E_1 + E_2)$ volts, while concurrently applying $+E_1$ volts to a first terminal;

(2) applying $-E_2$ volts and $+E_1$ volts to opposite ends of a second capacitor, respectively, for charging said second capacitor to have a voltage thereacross of $-(E_1 + E_2)$ volts, while concurrently applying $-E_1$ volts to a second terminal;

(3) concurrent with step (1) applying $-E_2$ volts to the positively charged end of said second capacitor, the other end of which is connected to said second terminal, for applying $-(E_1 + 2E_2)$ volts to said second terminal;

(4) concurrent with step (2) applying $+E_1$ volts to the negatively charged end of said first capacitor, the other end of which is connected to said first terminal, for applying $+(2E_1 + E_2)$ volts to said first terminal;

(5) performing repetitively selected ones of said first through fourth steps in a predetermined order not necessarily in numerical sequence, for producing a desired level of voltage at said first and second terminals, respectively, at first predetermined times within a period of time equivalent to the period of said waveform; and (6) concurrent with step (5) connecting one of said first and second terminals to an output terminal at second predetermined times within the period of said waveform, for producing said waveform at said output terminal.

24. In a DC to AC converter circuit including first and second capacitors, first and second DC voltage sources for providing first and second voltages of opposite polarity, and an output terminal, a method for selectively producing up to a three-tier stepwise approximated AC waveform having four different levels of voltage at said output terminal, comprising the steps of:

first-concurrently charging said first capacitor to a level for providing a third voltage thereacross substantially equal to the sum of the voltages from said first and second DC voltage sources, and applying said first voltage to said output terminal;

second-concurrently charging said second capacitor to a level for providing a fourth voltage thereacross opposite in polarity to said third voltage, and substantially equal to the sum of the voltages from said first and second DC voltages, and applying said second voltage to said output terminal;

third-connecting said first capacitor in series with said first DC voltage source, for applying to said output terminal a voltage having the same polarity as said first voltage and a level equal to the sum of said first and third voltages, while concurrently charging said second capacitor as in the second step;

fourth-connecting said second capacitor in series with said second DC voltage source, for applying to said output terminal a voltage having the same polarity as said second voltage and a level equal to the sum of said second and fourth voltages, while concurrently charging said first capacitor as in the first step; and fifth-performing selected ones of said first through fourth steps in a predetermined order, for producing at said output terminal an output signal having a desired waveform.

25. The method of claim 12 wherein said fifth step may further include successively and iteratively performing at predetermined times selected pairs of said first through fourth steps, for producing a notched waveform, thereby reducing the harmonic content of said waveform.

* * * * *